United States Patent [19]
Plummer

[11] 3,836,702
[45] Sept. 17, 1974

[54] MEANS FOR SEALING AND PROTECTING A CABLE SPLICE

[76] Inventor: Walter A. Plummer, 3546 Crowridge Dr., Sherman Oaks, Calif. 91403

[22] Filed: Apr. 3, 1973

[21] Appl. No.: 347,435

[52] U.S. Cl. ............... 174/92, 174/76, 174/138 F
[51] Int. Cl. ............................................ H02g 15/08
[58] Field of Search .......................... 174/91–93, 174/76, 77 R, 88 R, 110 F, 138 F; 29/628; 204/272

[56] References Cited
UNITED STATES PATENTS

| | | | |
|---|---|---|---|
| 2,930,835 | 3/1960 | Bollmeier | 174/76 |
| 2,967,795 | 1/1961 | Bollmeier et al. | 174/76 X |
| 3,187,090 | 6/1965 | Edwards | 174/DIG. 11 U |
| 3,619,481 | 11/1971 | Smith | 174/76 X |

*Primary Examiner*—Darrell L. Clay
*Attorney, Agent, or Firm*—Spensley, Horn and Lubitz

[57] ABSTRACT

A cable splice assembly is disclosed for connecting a first and a second cable, each of which include a plurality of conductors. An inner cover placed about the conductors is surrounded by an outer jacket having a valve and which is sealed at the first and second cable. An expandable liquid foam is injected through the valve into the volume defined by the jacket. The foam, after expanding and hardening, forms a relatively solid insulating mass about the conductors.

11 Claims, 10 Drawing Figures

PATENTED SEP 17 1974 3,836,702
SHEET 1 OF 2
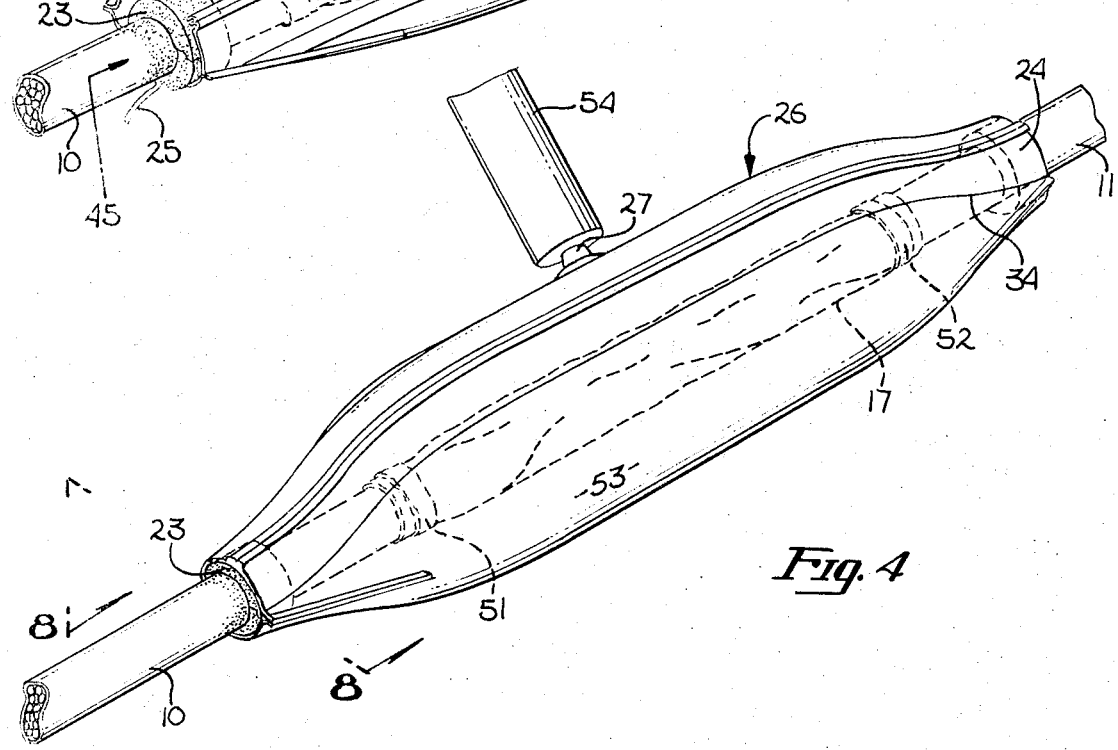

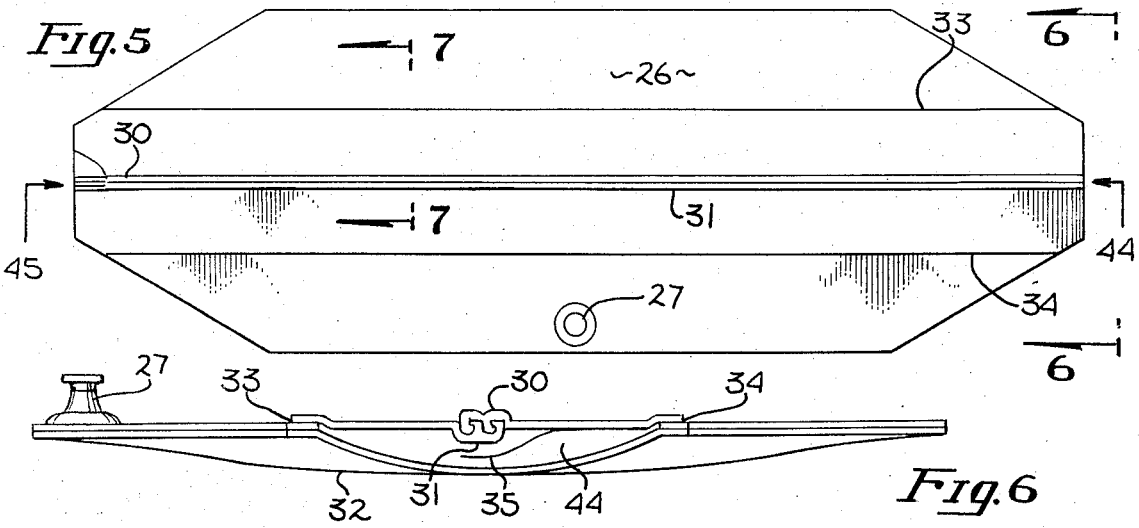
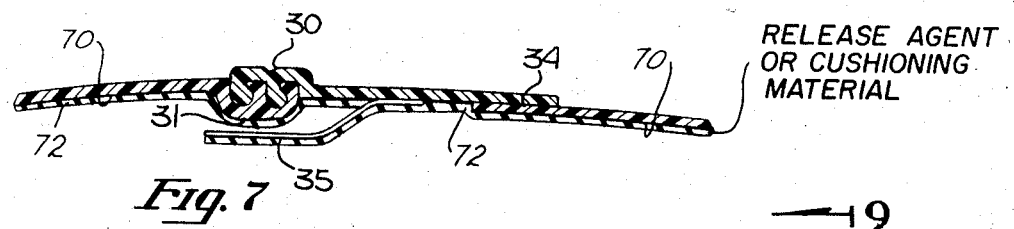
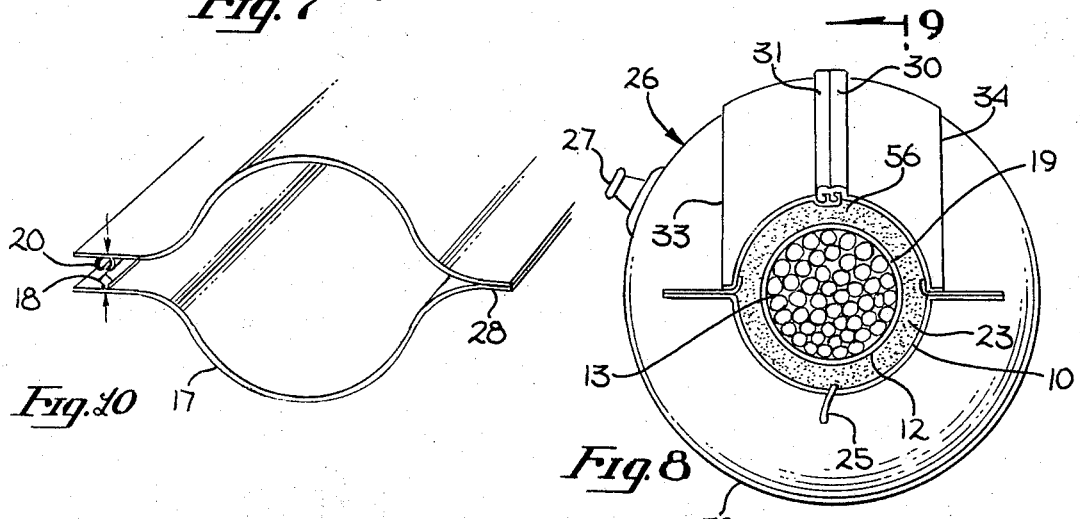
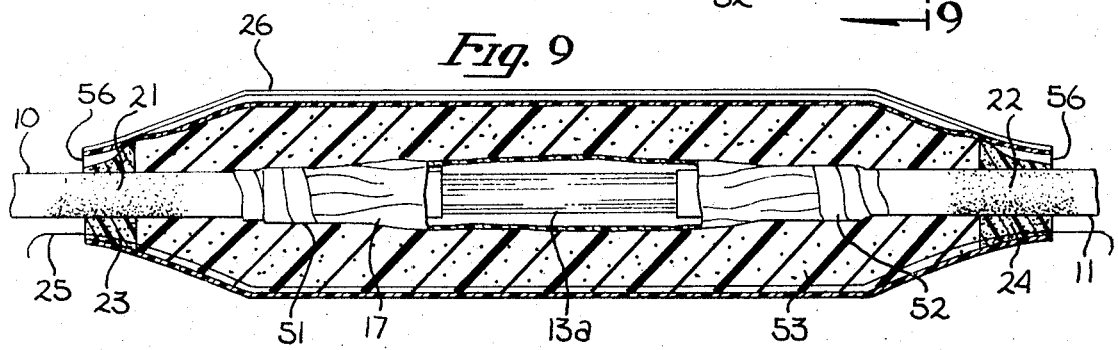

3,836,702

MEANS FOR SEALING AND PROTECTING A CABLE SPLICE

BACKGROUND OF THE INVENTION

1. Field of the Invention

The invention relates to the field of splice assemblies, particularly those utilized to splice cables containing a plurality of conductors.

2. Prior Art

Cables which include a plurality of conductors such as telephone cables often require splicing, that is the connecting of one cable to another cable such that the conductors of one cable are conductively connected to the conductors of the other cable. Numerous prior art methods and equipment for forming splices between cables are known in the prior art, such as the simplest type where tape is wrapped around the conductors of a cable. Other more complex splices or splice assemblies are known, some of which are costly and require a skilled technician for installation.

The present invention provides a splice assembly which may be temporary or permanent, and which may be installed by a person having a minimum amount of skill, in a short period of time and for a reasonable cost. The splice assembly, as will be seen, provides excellent protection from the elements, particularly moisture.

SUMMARY OF THE INVENTION

A splice assembly is described particularly adaptable for electrically connecting a first cable having a plurality of conductors to a second cable also having a plurality of conductors. After the conductors in the first and second cable have been electrically connected, a generally elongated flexible, plastic cylindrical cover which includes interlocking tracks is placed about the conductors and the interlocking tracks are secured. One end of the cover may be taped to the first cable while the other end of the conductor may be taped to the second cable. An elongated outer jacket which includes interlocking tracks is disposed about the cover and extends along the cables beyond the cover. Gaskets are placed at the ends of the outer jacket such that the outer jacket defines a relatively sealed volume between its inner wall and the cover placed about the conductors. A foaming agent or liquid foam is injected into the outer jacket through a one-way valve mounted on the outer jacket. This foaming agent which expands to approximately 30 times its original volume, completely fills the volume defined by the outer jacket and encapsulates the conductors. The foam, after expanding and drying, hardens into a substantially rigid material which is a dielectric. A ripcord or wire may be placed within the outer jacket and used to remove the foam from the cables.

BRIEF DESCRIPTION OF THE DRAWINGS

FIG. 1 illustrates a first cable which includes a plurality of conductors coupled to a plurality of conductors in a second cable.

FIG. 2 illustrates the cables of FIG. 1 with an inner cover disposed about the conductors and with a first and second gasket partially placed about the cables.

FIG. 3 illustrates the cables and partial splice assembly of FIG. 2 with an outer jacket disposed about the cover and gaskets of FIG. 2.

FIG. 4 illustrates the partial splice assembly of FIG. 3 wherein the outer jacket of FIG. 3 has been closed and sealed and wherein a filling tool is coupled to the valve mounted on the outer jacket.

FIG. 5 is a plan view of the outer jacket.

FIG. 6 is an end view of the outer jacket taken from section line 6—6 of FIG. 5.

FIG. 7 is a partial view of the outer jacket used primarily to illustrate the interlocking tracks taken through section lines 7—7 of FIG. 5.

FIG. 8 is a cross-sectional view of the splice assembly taken through section line 8—8 of FIG. 4.

FIG. 9 is a cutaway view of the completed splice assembly taken through section line 9—9 of FIG. 8.

FIG. 10 is a partial perspective view of the inner cover illustrating the interlocking tracks on the cover.

DETAILED DESCRIPTION OF THE INVENTION

Referring first to FIG. 1, there is shown a first cable 10 which includes a plurality of conductors such as conductors 13a and 13b, and a second cable 11 which also includes a plurality of conductors such as conductors 14a and 14b. Typically in such cables, such as telephone cables, each of the conductors are separately insulated and are contained within an outer envelope which defines the exterior of the cable. In some cables a metal or braided shield shown as shield 12 in FIGS. 1 and 8, is disposed about the conductors. In connecting cables 10 and 11, as is commonly done in the art, first each of the conductors of cable 10 are electrically connected to each of the conductors in cable 11. Commonly known connectors, illustrated as connectors 15, such as crimp connectors, are utilized for interconnecting each the conductors within cables and 11. In those cables which include a metal shield such as shield 12, a conductive material such as the shield disclosed in U.S. Pat. Nos. 3,089,915 or 2,960,561, may be connected between the shield of cable 10 and the shield of cable 11 to provide a continuous electrical path for the shield.

In the splice assembly of the present invention, after the conductors of one cable have been connected to the conductors of another cable, as illustrated in FIG. 1, an inner cover 17 is placed about the conductors and extends from the outer envelope of cable 10 to the outer envelope of cable 11 as shown in FIG. 2. The inner cover 17 illustrated in FIG. 10 may be a generally elongated flexible plastic member fabricated from two sheets of ordinary polyvinyl chloride sheet plastic, polyolefin or other suitable material. A pair of interlocking tracks 18 and 20 are disposed along the edges of the sheets so that the cover 17, after being disposed about the conductors, may be sealed. The other ends of the sheets are sealed, forming a seam 28. The interlocking tracks may be similar to those used in the trade and such as those disclosed in U.S. Pat. No. 2,960,561. In some embodiments it has been found desirable to place grease or a dielectric powder within the cover 17 although this is not always necessary. The ends of the cover 17 may be taped to the cables as is shown in FIG. 1 with tape 51, taping one end of cover 17 to cable 10 and tape 52 taping the other end of cover 17 to cable 11. While interlocking tracks are preferred, the inner cover may be a sleeve or a material wrapped about the conductors.

An outer jacket 26 as shown in FIG. 3 is disposed about the inner cover 17 and extends from the outer surface of cable 10 to the outer surface of cable 11 beyond the ends of the cover 17 such that the entire cover 17 is enclosed. Referring to FIGS. 5, 6 and 7, the structure of the outer jacket is clearly indicated. The outer jacket 26 is a generally elongated cylindrical member which includes tapered ends. These tapered ends terminate in apertures 44 and 45, the apertures through which the cables pass. As will be seen, these apertures may be slightly larger than the cables which they encircle so that with the use of a gasket the outer jacket may be sealed to the cables. The outer jacket 26 may be fabricated from a plastic such as the type of material used to fabricate the cover 17. In the presently preferred embodiment this plastic is of a heavier gauge than the plastic utilized for the cover 17. The plastic may be a clear or transparent plastic enabling a visual inspection of the foam which is added to the splice or the plastic may be colored to enable color coding of the various splice assemblies that may be utilized in a large system. The section of the jacket 26 disposed between the tapered ends of the jacket is generally larger as shown by the bottom 32 of the jacket and enables this section of the jacket to expand and become filled with foam as is generally shown in FIGS. 4 and 9. As is the case with the preferred embodiment of the inner case, the outer jacket 26 includes a pair of elongated interlocking tracks 30 and 31 which allow the outer jacket to be slipped over the cables and then secured in place. The interlocking tracks 30 and 31 (most clearly illustrated in FIG. 7) may be fabricated from known techniques and may be similar to tracks known in the prior art such as those shown in the above mentioned patent or those shown in U.S. Pat. No. 3,519,728. The interlocking tracks may be secured to the body of the outer jacket by heat fusion or other known means forming seams 33 and 34 or the tracks may be fabricated as part of the jacket 26 utilizing known extrusion techniques. A valve 27 is mounted to the outer jacket 26 to allow liquid to be injected into the volume defined by the interior of jacket 26 and the remainder of the splice assembly (particularly the cover 17). In the presently preferred embodiment conventional valve 27 is utilized which is constructed to allow fluid to pass through it in one direction only, namely, from the outside into the interior of the splice assembly. Thus, valve 27 prevents liquid injected into the splice assembly from escaping through it. A flap 35 may be used to prevent the expanding foam from contacting the interlocking tracks. This plastic flap extends longitudinally over the length of the tracks and is secured to the underside of the track 30.

Before the outer jacket 26 is placed over the partial slice assembly shown in FIG. 2, a section 21 of cable 10 and a section 22 of cable 11 are cleaned and then the outer surface of cables 10 and 11 are preferably roughened with a steel brush or other instrument as is commonly done in the art. A pair of gaskets 23 and 24 which may be resilient strips such as those fabricated from a sponge-like material are placed about the sections 21 and 22 as shown in FIGS. 2 and 3. These gaskets form a seal between the outer jacket and the cables. As will be appreciated, these gaskets are sometimes moved into place by the movement of the expanding foam. Under extreme wet conditions or where the internal pressure is high, a double backed pressure sensitive tape may be used between the gaskets and cables.

A ripcord or wire 25 may be placed within the outer jacket 26 such that it extends outward from the ends of the jacket through apertures 44 and 45 as shown in FIG. 3. This cord is utilized to remove the foam from the assembly after the outer jacket has been removed, hence providing a temporary splice assembly. Where a temporary splice is used it is desirable that the inner surfaces 70 of the outer jacket 26 be easily separated from the foam. This objective may be achieved by coating the inner surfaces 70 of the outer jacket 26 with a coating 72 which facilitates the separation sought. The coating 72, shown in phantom lines in FIG. 7, may be a releasing agent or a material which provides a non-adhering surface for the outer jacket's inner surfaces 70. In applications in which it is desirable to cushion the outer jacket 26 from the expanding foam, a coating 72 may also be added to the inner surfaces 70, except that in such applications, the coating 72 is of a resilient material.

After the outer jacket 26 has been placed about the cables 10 and 11, the interlocking tracks 30 and 31 have been joined, and the gaskets properly placed at the ends of the jacket, the volume defined by the jacket 26 is then filled with a dielectric foam 53. In the presently preferred embodiment a catalyst and liquid foaming agent are disposed within a single tool. Prior to the time that the tool 54 is placed on the valve 27, the catalyst is mixed with the liquid within the tool and then the entire mixture is injected from the filling tool 54 through the one-way valve 27 into the interior of the outer jacket 26. This foam, which is a commercially available product, expands to approximately 30 times its original volume and forms a substantially rigid dielectric material filling the entire volume defined by the outer jacket 26. In the presently preferred embodiment the insulating foam begins to harden in approximately 45 seconds after the introduction of the catalyst. This has been found to be a sufficient period of time to inject the foam into the jacket, although, if a longer period of time is required it is readily obtainable utilizing commercially available materials. The foam 53 once hardened protects the conductors from the elements, particularly from moisture. The foam 53 also compresses the inner cover and conductors. This is particularly important in a pressurized cable system since less strength is required to maintain the pressurization once the conductors are compressed. This compression secures the conductors in place, preventing most movement. In very warm or hot weather the plastic comprising the outer jacket and particularly the tracks, may be weakened and may require taping.

Referring particularly to FIG. 8, it has been found that the ends of the interlocking tracks (where these tracks contact the gasket such as gasket 23 of FIG. 8) define ports 56. These ports allow some gas to escape from the inner jacket and provide a satisfactory venting means thereby allowing the foam to readily expand, although most of the vented gas escapes through the gaskets.

Referring particularly to FIG. 9, it may be seen that the conductors, such as conductor 13a, once covered by the cover 17, do not come in contact with the filler or foam 53. Once the splice assembly is removed such as by use of cord 25, the conductors are readily accessible and do not require major cleaning before maintenance is performed on the conductors or cables.

While the presently preferred embodiment has been described with a single cable being coupled to another single cable, it will be apparent to one skilled in the art that two or more cables may be connected within the splice assembly, for example where two cables pass through the aperture 45 and one cable through the aperture 44. Additionally, the splice assembly may be used with pressurized cable since the assembly provides a pressure seal once the foam has hardened.

Thus, a light weight splice assembly has been disclosed which is relatively easy and fast to install and which provides greatly improved protection over prior art splice assemblies.

I claim:

1. An electrical cable splice assembly for protecting a plurality of conductors in a cable comprising:
    a. an inner cover comprised of a generally elongated, flexible plastic member having a first pair of interlocking tracks fixedly secured to corresponding edges along the length thereof, said tracks providing a means for securing said inner cover circumferentially about said conductors;
    b. an outer jacket comprised of a generally cylindrical flexible plastic member having first and second tapered ends, said conductors passing through corresponding apertures in said first and second ends thereof, said jacket including a second pair of interlocking tracks fixedly secured to corresponding edges along the length thereof, said second pair of tracks enabling said jacket to be openly slipped around said conductors and said inner cover and then closed thereabout, said jacket having fixedly secured thereto at least one valve arranged and configured to allow a fluid to pass from the exterior to the interior of said jacket;
    c. means for sealing said apertures circumferentially disposed about and secured to said conductors at locations thereon generally corresponding to said first and second ends of said outer jacket, said sealing means and said second pair of interlocking tracks defining ports for the escape of gas at each end thereof; and
    d. an insulating foam disposed within the enclosed volume of space defined by said jacket and said sealing means;
    whereby, said splice assembly protects said conductors from the elements.

2. The assembly defined in claim 1 wherein, in addition thereto, a ripcord is disposed within said outer jacket along the length thereof, a portion of said ripcord extending outward from at least one of said apertures, said ripcord enabling said foam to be removed after said jacket has been removed.

3. The assembly defined in claim 1 wherein said outer jacket has fixedly secured to the underside of said second pair of interlocking tracks a flap of flexible plastic along the length thereof, said flap preventing said foam from contacting said tracks.

4. The assembly defined in claim 1 wherein, in addition thereto, a releasing agent is disposed between said outer jacket and said foam so as to facilitate the removal of said jacket.

5. The assembly defined in claim 1 wherein the inner surface of said outer jacket is lined with a non-adhering material so as to facilitate the removal of said jacket.

6. The assembly defined in claim 1 wherein, in addition thereto, a resilient material is disposed between said outer jacket and said foam, said resilient material providing means for cushioning thereinbetween during the expansion of said foam.

7. The assembly defined in claim 1 wherein said means for sealing said apertures are first and second strips of resilient material.

8. The assembly defined in claim 7 wherein said strips are taped to said conductors.

9. The assembly defined in claim 1 wherein the ends of said inner cover are taped to said conductors.

10. the assembly defined in claim 1 wherein said foam compresses said inner cover and said conductors.

11. The assembly defined in claim 1 wherein said plastic is selected from the group consisting of polyvinyl chloride and polyolefin.

* * * * *